US008856368B2

(12) United States Patent
Bacher et al.

(10) Patent No.: US 8,856,368 B2
(45) Date of Patent: Oct. 7, 2014

(54) METHOD FOR DISTRIBUTING A PLURALITY OF DATA PORTIONS

(75) Inventors: Utz Bacher, Weil im Schoenbuch (DE); Einar Lueck, Stuttgart (DE); Stefan Raspl, Bondorf (DE); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 13/424,929

(22) Filed: Mar. 20, 2012

(65) Prior Publication Data

US 2012/0254370 A1    Oct. 4, 2012

(30) Foreign Application Priority Data

Apr. 1, 2011 (EP) ..................................... 11160784

(51) Int. Cl.
*G06F 15/16*    (2006.01)

(52) U.S. Cl.
USPC ....................................................... 709/230

(58) Field of Classification Search
CPC ................................................. H04L 61/1582
USPC ................................................. 709/203, 230
See application file for complete search history.

(56) References Cited

U.S. PATENT DOCUMENTS

| 5,991,542 A * | 11/1999 | Han et al. ..................... 717/167 |
| 6,981,032 B2 * | 12/2005 | Boivie et al. .................. 709/219 |
| 7,464,176 B2 | 12/2008 | Cohen et al. |
| 8,301,686 B1 * | 10/2012 | Appajodu et al. ............ 709/201 |
| 8,468,135 B2 * | 6/2013 | Constantinescu et al. .... 707/640 |
| 2006/0155735 A1 * | 7/2006 | Traut et al. .................... 707/101 |
| 2009/0300185 A1 | 12/2009 | Letellier et al. |
| 2011/0218969 A1 * | 9/2011 | Anglin et al. ................. 707/679 |
| 2011/0314070 A1 * | 12/2011 | Brown et al. ................. 707/827 |
| 2012/0254370 A1 * | 10/2012 | Bacher et al. ................. 709/219 |

FOREIGN PATENT DOCUMENTS

WO    2009/085266 A2    7/2009

* cited by examiner

*Primary Examiner* — Lance L Barry

(74) *Attorney, Agent, or Firm* — Steven Chiu, Esq.; Kevin P. Radigan, Esq.; Heslin Rothenberg Farley & Mesiti P.C.

(57) ABSTRACT

A method and computer system are provided for distributing a plurality of data portions from a server system to one or more client systems. The method includes receiving one or more first requests at the server, each first request being submitted by a client system and including a portion identifier, wherein a portion identifier is assigned to each data portion; in response to receiving the first request(s), transmitting a list of chunk identifiers to the requesting client systems, wherein the list of chunk identifiers specifies the data chunks whose meta-data includes the portion identifier contained in the first request; and transmitting some or all data chunks of a data chunk library to each of the requesting client systems. At the requesting client system, the client specifically selects the data chunks of the transmitted data chunks which are specified by the received list of chunk identifiers.

12 Claims, 5 Drawing Sheets

METHOD FOR DISTRIBUTING A PLURALITY OF DATA PORTIONS

PRIOR FOREIGN APPLICATION

This application claims priority from European patent application number EP11160784.2, filed Apr. 1, 2011, which is hereby incorporated herein by reference in its entirety.

FIELD OF THE INVENTION

The present invention relates to the field of distributing data portions from a server computer system to a plurality of client computer systems.

BACKGROUND

Image distribution and deployment is an important aspect for a multitude of different application scenarios, e.g. cloud computing, which heavily rely on server virtualization and distributing disk images, in the following referred to as 'images', to a multitude of virtual server hosting environments on request. Accordingly, efficient methods for distributing data portions such as disk images from one computer system to a multitude of other computer systems is one of the most important underpinning technologies of many of today's cloud services. The dynamics of cloud environments require frequent instantiation of virtual servers, very often combined with the deployment of images. Often, there are several different types of images which are distributed to a multitude of virtual server hosting environments. The efficiency and speed of image distribution is therefore of essential importance in the field of cloud computing. Current image distribution technologies are often not efficient enough to concurrently distribute a multitude of images quickly.

In computer networking, different approaches are known to deliver data from a data source to one or more destinations. Multicast transmission is the delivery of data to a group of destination computers simultaneously in a single transmission, whereby copies of the transferred data are created automatically in network elements other than the data source, e.g. in routers, when the topology of the network requires it. At the data link layer, multicast describes a one-to-many distribution such as Ethernet multicast addressing or Infiniband multicast. In multicasting, the data source sends its data only to processing devices having registered at a multicast destination address. To the contrary, unicast transmission is the sending of data to a single network destination identified by a unique address. Both multicast and unicast image distribution technologies are commonly used in current server farms. Typically, for each virtual machine (VM) to be instantiated on a computer system providing for a virtual server environment, unicast network protocols are used to transfer an image from an image server to said computer system. A drawback of this protocol is that the required network bandwidth is directly proportional to the number of image transmissions. A duplication of the number of images to be transmitted in unicast transfer mode implies the duplication of the required network bandwidth or the duplication of the transfer time.

Therefore, in high performance computing (HPC) environments, multicast protocols are preferentially used which consume considerably less bandwidth. Common protocols used for this multicast data transmission include BOOTP, PXE, IP, DHCP, HTTP, FTP and MTFTP or proprietary protocols. A drawback is, however, that typically the images transferred in multicast mode to multiple destinations have to be identical. As often the case, some images may share large parts of their respective data, e.g. the data specifying the installed operating system, while each image may in addition comprise user-specific data such as additionally installed programs and/or user data. Various approaches for transferring images to multiple destinations exist:

U.S. Pat. No. 6,981,032 discloses a multicast-based web server being operable to distribute common parts of web content via multicast protocols to a plurality of clients.

U.S. Pat. No. 7,464,176 discloses a multicast system and method for deploying multiple images simultaneously. The first image comprises first file data and common data and the second image comprises second file data and the common data. The common data, the first file data and the second file data are distributed via multicast to the plurality of clients via a shared network linking the server to said clients.

U.S. Patent Publication No. 2009/0300185 A1 describes a method for receiving audiovisual programs sent by a server to at least two reception devices. Initially, a first user requests a document from the server that establishes a unicast stream to download said document. Then, a second user requests to receive the same document, even when partially truncated. The server studies the proposal and possibly agrees to the download. The server is operable to switch the broadcast of the document from a unicast stream to a multicast stream. The first and the second devices receive said document via the same multicast stream.

International Patent Publication No. WO 2009/085266 discloses a method for transmitting audio and visual programming content by identifying an amount of broadcast transmission capacity available for transmitting the content to one or more users. The content is separated into at least first and second portions based on user demand for the content and/or the identified available broadcast transmission capacity.

BRIEF SUMMARY

It is an objective of embodiments of the invention to provide for a client- and server-computer system and corresponding computer program products and computer-implemented methods for increasing the efficiency of distributing one or more data portions from the server computer system to one or more client computer systems. Said objective is solved by the subject matter of the independent claims. Advantageous embodiments are described in the dependent claims.

In one beneficial aspect, embodiments of the present invention provide for a system and method for using multicast protocols also for the distribution of differing data portions, e.g. different images, to a multitude of clients, thus reducing the overall network bandwidth being allocated e.g. for image distribution purposes.

In one aspect, the present invention relates to a method for distributing a plurality of data portions from a server computer system to a plurality of client computer systems, wherein the server computer system is operatively coupled to a non-transitory computer-readable storage medium. The storage medium comprises a data portion library. The data portion library comprises the plurality of data portions, each data portion being dividable into data chunks. A portion identifier is assigned to each data portion. The storage medium comprises a data chunk library. The data chunk library comprises all the data chunks constituting the plurality of data portions. Meta-data is assigned to each data chunk of the data chunk library, the meta-data of a given data chunk comprising the portion identifiers of the data portions said data chunk is contained in. The method comprises:

a) submitting one or more first requests, each first request being submitted by one of the client computer systems and comprising one of the portion identifiers,
b) receiving by the server computer system said one or more first requests,
c) in response to each of the one or more first requests, submitting by the server computer system a list of chunk identifiers to the requesting client computer system, wherein said list of chunk identifiers specifies the data chunks whose meta-data comprise the portion identifier contained in said first request,
d) receiving by each requesting client computer system said respectively submitted list of chunk identifiers,
e) transmitting by the server computer system some or all data chunks of the data chunk library to each of said requesting client computer systems, and
f) specifically selecting by each of said one or more requesting client computer systems the data chunks of the transmitted data chunks which are specified by the received list of chunk identifiers.

Thereby, a chunk identifier can be any kind of information which is unique for a particular data chunk, e.g. a hash sum of said data chunk.

According to one embodiment, the meta-data of each data chunk in said data chunk library comprises in addition positional data. Positional data is data being indicative the one or more positions of a particular data chunk within a particular data portion.

According to one embodiment, the data chunk library comprises a unique set of data chunks having been derived from the totality of data portions contained in the data portion library. Each data chunk of said data chunk library comprises meta-data, wherein the meta-data of each chunk comprises portion identifiers of one or more data portions the data chunks of the data chunk library that derived from. For each data portion said meta-data comprises information on one or more positions where said data chunk was located in the respective data portion.

A library comprising a set of unique data chunks and associated meta-data is advantageous, because it provides for a very condensed, non-redundant data structure comprising all the information needed to reconstruct the data portions said data chunk library was derived from. Accordingly, the size of the data chunk library may be only a fraction of the total size of the data portion library, but the information content is basically the same. According to one embodiment, the data chunk library and the data portion library are maintained by the server. In an additional advantageous aspect, data chunks having assigned meta-data comprising positional information helps avoiding redundancy, because in case a particular data chunk is contained in a data portion multiple times, this information can be represented by one single copy of said data chunk having assigned information on all positions where said data chunk was originally located.

According to embodiments, an image library is a data structure comprising a plurality of unique data portions such as a set of images, wherein some images may be based on a UNIX file system such as ext2 or ext3 while other images may be based on Windows file-systems, e.g. FAT 32. Typically, each image comprises user specific data in addition to the data specifying the operating system. All that images are registered in the data portion library, here called 'image library'. This implies that even if said data portions differ with respect to their overall content, at least some data portions will share parts of their data, e.g. data specifying the operating system, specifying 'empty' memory blocks or specifying memory blocks corresponding to application programs having been installed on multiple images. The location of the shared data may thereby differ from data portion to data portion. Even in case a data portion is one single file, there may exist some memory blocks shared between a multitude of files (data portions). The server may then start transmitting the data chunks of the requested data portion or wait in order to receive and pool additional first requests.

According to embodiments, when a client submits a first request for receiving a data portion, the server does not start with the transmission of the requested data portion immediately. Rather, the server uses the data chunk library to compile a list of chunk identifiers for the requested data portion. Said list of chunk identifiers is then sent back to the requesting client.

According to embodiments, the method is executed by components of a virtual machine image distribution infrastructure, wherein the data portions are images, wherein the server is a virtual machine image server, and wherein the method further comprises the step of storing by each of said one or more requesting clients the specifically selected data chunks to a storage volume operatively coupled to said client, thereby creating a local copy of one of said images on said storage volume.

In a further aspect, the invention relates to a computer-implemented method for receiving a data portion from a server, the method being executed by a client and comprising:
a) submitting a first request to the server, said first request comprising a portion identifier of the data portion,
d) receiving a list of chunk identifiers of data chunks from the server in response to the first request, wherein the data portion is constituted by data chunks being identified by said list of chunk identifiers,
e) receiving a plurality of data chunks being transmitted from the server,
f) specifically selecting the data chunks from said plurality of received data chunks which are specified by said received list of chunk identifiers.

According to some of said embodiments, a client having received said list of chunk identifiers in a further step initiates the transmission of the data chunks whose identifiers had been received in a previous step in the form of a list of chunk identifiers. According to some embodiments, the network interface of each client is adapted for submitting a second request to the server, wherein said second request is indicative of the client and initiates the transmission of the plurality of second data chunks. Said second request can be transmitted to the server before or after the client has received the list of chunk identifiers. According to embodiments, said second request may be submitted by a client after a predefined time out during which the client did not receive a particular requested data chunk or did not receive any data chunk at all.

According to embodiments, the method further comprises: after having received the respective list of chunk identifiers, submitting a second request by the at least one requesting client to the server, wherein each second request is a request for initiating the transmission and is indicative of the client having submitted said second request; receiving and collecting said one or more second requests by the server during a time period; and evaluating the collected at least one second requests by the server, wherein the composition of the data chunks to be transferred to the clients having submitted the second requests depends on the result of the evaluation. The transmitted data chunks comprise at least the data chunks having been specified in the lists of chunk identifiers having been submitted to requesting clients.

According to other embodiments, the submission of a second request is not necessary in order to initiate the data transfer as the server considers each received first request for a data portion also as a request for initiating the transmission of the respective data chunks. Depending on the embodiment, the server computer waits for a predefined or dynamically determined time period in order to collect a plurality of first (or second) requests from a plurality of clients and for scheduling the transmission of data chunks to said plurality of requesting clients in dependence on the received and collected first (or second) requests.

After having received a first or second request from said client, or after having received a request for resubmission of an outstanding data chunk, the server can then determine the data chunks corresponding to the data portions having been requested by the one or more clients or the outstanding data chunks for said client. The determined data chunks are compared with the set of data chunks whose transmission is already in progress and/or with data chunks having been scheduled for transmission to the one or more clients. Data chunks which are already scheduled to be transferred to one or more other clients can be dynamically determined and the transmission mode of said 'multi-destination' data chunks can be dynamically adapted. For example, according to some embodiments the transmission mode of a particular data chunk is automatically switched from unicast mode to multicast mode in case said data chunks is scheduled to be submitted to more than one client. All clients having registered at the multicast destination address of the server receive the transferred data chunks via the same multicast stream.

According to embodiments, the computer-implemented method further comprises the step of dynamically determining, for each of the data chunks to be transferred to the one or more requesting client computer systems, the number of requesting client computer systems being scheduled for receiving said data chunk. Thereby, the transmission of each data chunk is executed in a transmission mode which depends on said determined number. According to some embodiments, the transmission mode is a multicast transmission mode for transmitting data chunks having been requested by two or more client computer systems, and wherein the transmission mode is a unicast transmission mode for transmitting data chunks having been requested by only one client computer system.

According to embodiments, the submission of data chunks from a server to a plurality of clients in multicast mode is accomplished by sending all data chunks to be transferred to the plurality of clients by the server to a multicast destination address (e.g. an IP address). All clients having registered for that multicast destination address via their routers will receive a stream of data chunks having been submitted by the server to said multicast destination address. The creation of copies of data chunks to be delivered to the respective clients is the task of network devices, e.g. routers, in dependence on the network topology. The number of clients having registered as recipient of the transferred data chunks does therefore not increase the computation load of the server. This is different for the unicast mode according to which the server submits data chunks directly to each particular client.

According to embodiments, clients subscribe at a multicast destination address of the server for individual data chunks, not for a whole data portion. This is advantageous, because it allows for a much more fine-grained scheduling of the transfer of data chunks to a plurality of clients. To the contrary, prior art systems commonly are based on clients requesting and registering for whole data portions. According to some embodiments, the list of chunk identifiers having been received by each requesting client comprises in addition, for each data chunk specified by a chunk identifier in said list, positional information. Said positional information is indicative of one or more positions of said data chunk within the requested data portion and can be used for assembling a copy of the requested data portion by the client.

According to some embodiments, the server communicates with the plurality of clients via a proxy processing system. The proxy processing system receives the one or more first requests submitted in step a) from the plurality of clients and forwards said first requests to the server. The proxy processing system then receives the one or more list of chunk identifiers submitted by the server in step c) and forwards said one or more list of chunk identifiers to the respective clients. In addition, the proxy processing system aggregates said received one or more list of chunk identifiers to one proxy-chunk-list. Each data chunk transmitted by the server in step e) is received from the proxy processing system and forwarded to the plurality of clients. The proxy processing system forwards each of said data chunks in multicast mode in case said data chunk is specified by a chunk identifier in said proxy-chunk-list. In case said data chunk is not specified by a chunk identifier of said proxy-chunk-list, the proxy processing system forwards said data chunk to the respective client in unicast transmission mode. According to embodiments, forwarding data chunks by the proxy processing system in unicast mode simply implies forwarding the data chunks to the one or more unicast address of the respective client without any further processing of the data chunk. Said embodiments are advantageous, because they allow transmitting data chunks in multicast mode even in case the network connection connecting the server and a client does not support multicast communication, as is the case e.g. for virtual private networks (VPN). In another advantageous aspect, the proxy processing system reduces the processing load of the server by taking over the tasks of collecting first client requests and scheduling the transmission of data chunks to the individual clients. According to embodiments, the proxy processing system comprises a chunk transmission scheduler (CTS) module, a client manager (CM) module and a chunk transmitter (CT) module. The data portion library, the data chunk library and a chunk analyzer (CAn) module still reside at the server.

According to embodiments, the proxy processing system is a computer system. According to other embodiments, the proxy processing system is a network device, e.g. a router. According to some embodiments, the proxy processing system hides the clients and the server from each other by acting as a plurality of clients when communicating with the server and acting as server when communicating with the clients. The proxy processing systems registers at one or more multicast destination addresses said plurality of clients are registered for. After having received data chunks via said address, the proxy processing system forwards the data chunks received via said one or more multicast addresses to the clients having registered at said one or more destination addresses. In other words, the proxy processing system forwards all requests and responses of the clients and the server to the respective destination. The proxy processing system submits data to be transmitted via multicast mode to multicast destination addresses the requesting clients have registered at, and forwards data chunks to be transferred to a single client in unicast mode.

In the following, embodiments of the method involving the server and one or more clients will be described in greater detail by focusing on the server side and on the client side respectively.

Server Side:

In a further aspect, the invention relates to a server for distributing a plurality of data portions, wherein the server is operatively coupled to a non-transitory computer-readable storage medium, the storage medium comprises a data portion library, the data portion library comprising the plurality of data portions, each data portion being dividable into data chunks, wherein a portion identifier is assigned to each data portion, and the storage medium comprises a data chunk library, the data chunk library comprising all the data chunks constituting the plurality of data portions, wherein meta-data is assigned to each data chunk of the data chunk library, the meta-data of a given data chunk comprising the portion identifiers of the data portions said data chunk is contained in. The server comprises a network interface for receiving one or more first requests, each first request being submitted by a client and comprising one of the portion identifiers, a CM module for submitting in response to each of the one or more first requests a list of chunk identifiers to the requesting client, wherein said list of chunk identifiers specifies the data chunks whose meta-data comprise the portion identifier contained in said first request, and a CTS module for transmitting some or all data chunks of the data chunk library to each of said requesting clients.

According to embodiments, the data chunks of the data chunk library are unique.

In one advantageous aspect, embodiments of the invention comprise requesting a single large data portion by submitting a first request comprising a portion identifier of that requested data portion. The requested data portion may not be received by the client directly. Rather, said client receives a list of chunk identifiers of those data chunks of the data chunk library comprising in their meta-data the portion identifier of the requested data portion. In other words, said list of chunk identifiers constitutes the requested data portion. According to embodiments, the server manages the totality of available data portions and also the data chunk library. Therefore, the server computer can pre-compile, for each of said data portions, a respective list of chunk identifiers constituting said data portion.

Some state-of-the-art server systems are based on the comparison of multiple data portions scheduled for transmission to multiple different clients. Said comparison comprises the analysis of said data portions in order to determine common data and to transfer said common data e.g. in a multicast mode. To the contrary, embodiments of the invention are based on a comparison and evaluation of a multitude of lists of chunk identifiers requested by different clients. As the data chunk library according to embodiments does not comprise any redundancy, the list of chunk identifiers having been derived therefrom are also free of any redundancies and can be compared with each other highly efficiently. The comparison of data chunk identifier lists instead of comparing data to be transferred significantly accelerates the task of deciding according to which transfer mode a particular data chunk is to be transmitted to one or more clients. In addition, the provision of pre-calculated chunk identifiers, e.g. hashes, further accelerates the evaluation.

According to some embodiments, the CTS module is in addition adapted for optimizing the distribution of the data chunks to be transmitted to the one or more requesting clients. The optimization is selected from the group comprising:
   minimizing the overall time for transferring all data chunks of the at least one requested data portion to the one or more requesting clients,
   minimizing the time for transferring all data chunks of the at least one requested data portion to a sub-set of the one or more requesting clients, each client belonging to said sub-set having assigned a priority level, and
   minimizing the time for transferring a first set of data chunks of the at least one requested data portion to the one or more requesting clients, the first set of data chunks being a sub-set of all data chunks scheduled for transmission to the one or more clients.

Any combination of said minimization options is likewise possible. Minimizing the time for transferring all data chunks of the at least one requested data portion to the one or more requesting clients is advantageous, because this optimization strategy allows a fair scheduling of data chunks to be transmitted to all requesting clients in a way that the overall transmission time for all requesting clients is minimized irrespective of the identity of the client. Minimizing the time for transferring all data chunks of the at least one requested data portion to a sub-set of the one or more requesting clients is advantageous, because it allows to define clients belonging to different service classes, e.g. 'gold clients' or 'silver clients' which receive their requested data chunks in dependence on their assigned service class/pricing category quicker than clients belonging to other service classes. Minimizing the time for transferring a first set of data chunks of one or more requested data portions is advantageous, because it allows transferring data chunks constituting e.g. data which is essential for starting an operating system prior to user data (which is typically not required immediately during system start). As a result, an image may be initialized on a client already at a moment in time when the transfer of all data chunks constituting said image has not yet been completed. As a result, the client may be able to initiate the operating system of a requested image even in case the totality of data chunks of the requested image has not yet been transferred to the client.

According to some embodiments, the CTS module is in addition adapted for: dynamically determining, for each of the data chunks to be transferred to the one or more requesting clients, the number of requesting clients being scheduled for receiving said data chunk, wherein the transmission of each data chunk is executed in a transmission mode which depends on said determined number. According to some embodiments, the transmission mode is a multicast transmission mode for transmitting data chunks having been requested by two or more clients, and wherein the transmission mode is a unicast transmission mode for transmitting data chunks having been requested by only one client. Depending on the embodiment, multiple transmission modes, e.g. unicast and multicast transmission mode may be used by the server simultaneously or in a sequential order in order to transmit data chunks to the requesting one or more clients.

According to some embodiments, the server further comprises a data chunk analyzer (CAn) module, wherein the CAn module is adapted for analyzing each data portion, thereby splitting said data portion into a set of unique data chunks and assigning the meta-data to each of said unique data chunks, and for storing the unique data chunks with assigned meta-data, thereby creating the data chunk library. The term 'splitting' as used herein should be understood as a process of logically dividing a data portion in order to derive data chunks constituting each particular data portion, the data portions are physically not altered by the chunking process.

According to embodiments, the analysis of each data portion comprises the following steps: determining, for each data portion, all memory blocks of fixed size constituting said data portion; calculating, for each of said memory blocks, a hash value; comparing all calculated hash values of all memory blocks of a first data portion with the calculated hash values of memory blocks of all other data portions; determining identical hash values as a result of said comparison; specifying data chunks by concatenating multiple consecutive memory blocks shared by two or more data portions; adding all specified data chunks not being contained in the data chunk library yet to the data chunk library, wherein each added data chunk comprises meta-data comprising one or more data portion identifiers and corresponding positional information; and updating a specified data chunk with positional information of a newly added data portion in case said data chunk was already contained in the data chunks library. Depending on the embodiment, the specification of a data chunk based on a multitude of memory blocks of fixed size, e.g. 4 kb, may be implemented differently. A compromise has to be found between specifying data chunks of large size which reduce scheduling overhead but which may not be shared by many data portions on the one hand, and the specification of data chunks of small size which may slightly increase the scheduling overhead but come with the benefit that small data chunks have a higher chance of being shared by multiple data portions.

In a further aspect, the invention relates to a computer-implemented method for distributing a plurality of data portions from a server to a plurality of clients, wherein the server is operatively coupled to a non-transitory computer-readable storage medium, wherein the storage medium comprises a data portion library, the data portion library comprising the plurality of data portions, each data portion being dividable into data chunks, wherein a portion identifier is assigned to each data portion, and wherein the storage medium comprises a data chunk library, the data chunk library comprising all the data chunks constituting the plurality of data portions, wherein meta-data is assigned to each data chunk of the data chunk library, the meta-data of a given data chunk comprising the portion identifiers of the data portions said data chunk is contained in. The method comprises:
  b) receiving one or more first requests, each first request being submitted by one of the clients and comprising one of the portion identifiers,
  c) in response to each of the one or more first requests submitting a list of chunk identifiers to the requesting client, wherein said list of chunk identifiers specifies the data chunks whose meta-data comprise the portion identifier contained in said first request, and
  e) transmitting some or all data chunks of the data chunk library to each of said requesting clients.

According to embodiments, said 'some or all' data chunks transmitted to the one or more requesting clients are determined dynamically by the server by evaluating the data chunks having been requested by one or more clients respectively. According to preferred embodiments, the 'some or all' data chunks transferred to each particular requesting client comprise at least the data chunks specified in the list of chunk identifiers of said clients which corresponds to the set of data chunks necessary to re-assemble a local copy of the data portions requested by said client in its first request. However, the transferred data chunks may comprise more data chunks than those requested by the client, in particular if said data chunks are transferred in multicast mode. According to some embodiments, said 'some or all' data chunks transmitted to the one or more requesting clients consist of all data chunks belonging to any of the data portions having been requested by at least two requesting clients.

According to embodiments, the CTS module is in addition adapted for receiving and collecting one or more second requests during a time period, wherein each second request is a request of one of the requesting clients for initiating the transmission step e) and is indicative of the client having submitted said second request, and evaluating the collected one or more second requests by the server. The composition of the data chunks transferred in step e) depends on a result of the evaluation and comprises at least the data chunks having been specified in the lists of chunk identifiers having been submitted to said two or more clients in step c).

According to some of said embodiments, the CTS module implements scheduling algorithms which further optimize the efficiency of data portion distribution. According to some embodiments, said CTS module is operable to decide to wait for additional first request from other clients in order to transmit data chunks in a way in order to achieve highest overall efficiency for all requesting clients. The requesting clients then receive the individual data chunks of a data portion as specified in the respective list of chunk identifiers having received by each client. The client then assembles the received data chunks into the overall data portion.

According to embodiments of the invention, the server comprises, for each client having submitted a first request, a list of chunk identifiers of outstanding data chunks, said list being herein referred to as list of outstanding data chunks. For example, said list of outstanding data chunks may be created as a server-side copy of the list of chunk identifiers which is submitted to the requesting client. According to embodiments, each client acknowledges the receipt of each data chunk to the server, thereby allowing the server to dynamically update its respective list of outstanding data chunks.

According to some embodiments, said dynamically updated one or more lists of outstanding data chunks is used by the CTS module in order to dynamically adapt the schedule according to which data chunks are to be transferred from the server to the one or more requesting clients. Outstanding data chunks can be sent a second time either in unicast or multicast mode depending on the number of clients for which said outstanding data chunks are still outstanding. According to some embodiments, outstanding data chunks are submitted via unicast protocols as unicast protocols such as TCP provide for some error control mechanisms which may prevent transmission failures which may have been the cause that a particular data chunk was outstanding. Multicast transmission protocols such as UDP lack such error control mechanisms.

According to embodiments, in case a data chunk is missing for a particular client, said client can request retransmission of a data chunk. Retransmission of a data chunk can be requested e.g. after a predefined time out is reached. For example, in case a requested data chunk has not been received by a client 1 second after said client has submitted the first or the second request to the server, said client may submit an additional request for retransmission of said particular data chunk. The server then decides, in dependence on the number and identity of data chunks having been requested by other clients, to transfer said data chunk by using unicast transmission mode (i.e. the transmission is based on unicast protocols) or by using multicast transmission mode (i.e. the transmission is based on multicast transmission protocols).

Client Side:
In a further aspect, the invention relates to a client for receiving a data portion from a server, the client comprising:
  a network interface for submitting a first request for the data portion to the server, said first request comprising a portion identifier of the data portion, said data portion being dividable into first data chunks, and
  a chunk assembler (CA) module for receiving a list of chunk identifiers of the first data chunks from the server in response to the first request, for receiving a plurality of second data chunks being transmitted from the server, the plurality of second data chunks comprising the first data chunks, and for specifically selecting the first data chunks from said plurality of received second data chunks which are specified in the received list of chunk identifiers.

According to some embodiments, the client is a virtual machine hosting environment, wherein the data portions are images, wherein the server is a virtual machine image server, and wherein the client further comprises a client-side manager module for storing the specifically selected first data chunks to a storage volume operatively coupled to said client, thereby creating a copy of one of said images on said storage volume. According to some embodiments, the network interface is in addition adapted for submitting a second request to the server, wherein said second request is indicative of the client and initiates the transmission of the plurality of second data chunks.

In a further aspect, the invention relates to a computer-implemented method for receiving a data portion from a server, the method being executed by a client and comprising the steps of submitting a first request to the server, said first request comprising a portion identifier of the data portion, receiving a list of chunk identifiers of data chunks from the server in response to the first request, wherein the data portion is constituted by data chunks being identified by said list of chunk identifiers, receiving a plurality of data chunks being transmitted from the server, and specifically selecting the data chunks from said plurality of received data chunks which are specified by said received list of chunk identifiers.

In a further aspect, the invention relates to a computer-readable non-transitory storage medium for executing any one of the above methods.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a 'module' or 'system'. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

BRIEF DESCRIPTION OF THE SEVERAL VIEWS OF THE DRAWINGS

The above and other items, features and advantages of the invention will be better understood by reading the following more particular description of embodiments of the invention in conjunction with the figures wherein.

DETAILED DESCRIPTION

Definitions

A 'data portion' as used herein encompasses any logically and/or physically related collection of data. For example, a data portion may be a disk image, a single data file, e.g. an audio or video file, a set of files, a file directory and its data content or the like. A data portion may be stored in one or more storage media.

An 'image' as used herein is a file system image. Unlike a backup, a file-system image also comprises information on the file system structure of the original disk(s), not only the raw data/the file contents stored to said image.

A 'server computer system' or 'server' as used herein encompasses any computing device acting as a data source for distributing data portions to one or more 'client computer systems'. Accordingly, a 'client computer system' or 'client' is any computing device being operable to receive a copy of a data portion from said server computer system. The terms 'server' and 'client' are merely used to describe the functional relation between both types of computer systems. Each client may act as a server in respect to a multitude of other computer systems. For example, a client according to embodiments of the invention may act as a VM hosting environment, i.e. a server virtualization platform with attached storage. The term 'computing device' encompasses e.g. computer systems, notebooks, Smart phones, networking devices and the like.

The term 'data chunk' as used herein encompasses any piece of data having been derived from a data portion by applying some analysis and chunking operations. For example, a set of data chunks can be derived by splitting a data portion into succeeding memory blocks of a fixed size, e.g. 4 kilobyte (kb). The size and/or the boundaries of a data chunk may also be determined by the size of the memory blocks of a file system a data portion is based on.

The term 'machine-readable medium' should be taken to include a single medium or multiple media (e.g., a centralized or distributed database, and/or associated caches and servers) that store data and/or computer interpretable instructions. The term 'computer-readable non-transitory storage medium' shall accordingly be taken to include, but not be limited to, solid-state memories, optical and magnetic media, etc. such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

Embodiments of the invention are described herein after by way of examples with reference to the accompanying figures and drawings.

Figure 1:
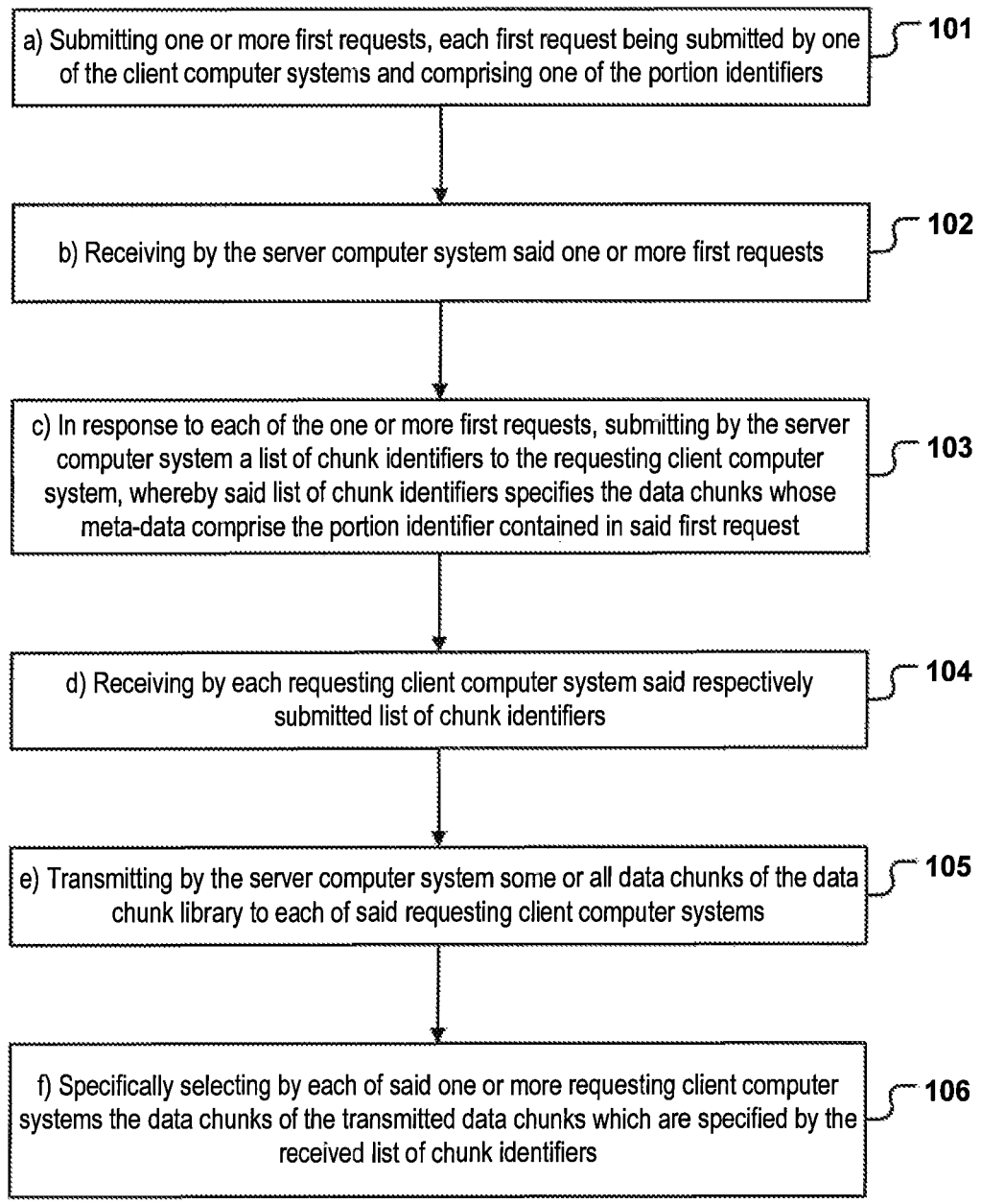
FIG. 1 depicts a flowchart of a method for distributing data portions to a plurality of clients.

FIG. 1 depicts a flowchart for transferring one or more data portions from a server to a plurality of clients. In step 101, each of said one or more clients submits a first request to the server. Each first request comprises a portion identifier of a data portion requested by that client. In the next step 102, the server receives the one or more first request. According to embodiments, the server provides for an application interface 316 enabling a client to submit requests for data portions. According to some embodiments, said API may in addition be used by the server for receiving progress status information and/or requests for resubmission of outstanding data chunks from each client. In response to each of the one or more first requests, the server submits 103 a list of chunk identifiers to each of the requesting clients. The chunk identifiers contained in said one or more lists thereby specify the data chunks whose meta-data comprise the portion identifier of the requested data portion. Each requesting client receives 104 the list of chunk identifiers having the submitted from the server to the client respectively. The server then transmits 105 some or all data chunks of the data chunk library to each of the requesting clients. According to embodiments of the invention, the set of data chunks to be transferred to the requesting clients are determined by the server by evaluating the plurality of first requests and are based on unicast—as well as multicast transmission protocols. The set of data chunks actually transferred to each client is not necessarily identical to the set of data chunks required by that client in order to assemble a copy of the requested data portion. Therefore, each client has to specifically select 106 that particular data chunks from the set of transmitted data chunks which are specified by the received list of chunk identifiers. The received data chunks can be further processed in a variety of ways. They can be used as input for application programs and/or can be stored to a computer readable storage medium. Storing may be executed based on the meta-data having been assigned to each received data chunk, in particular based on the positional information contained therein.

Figure 2:
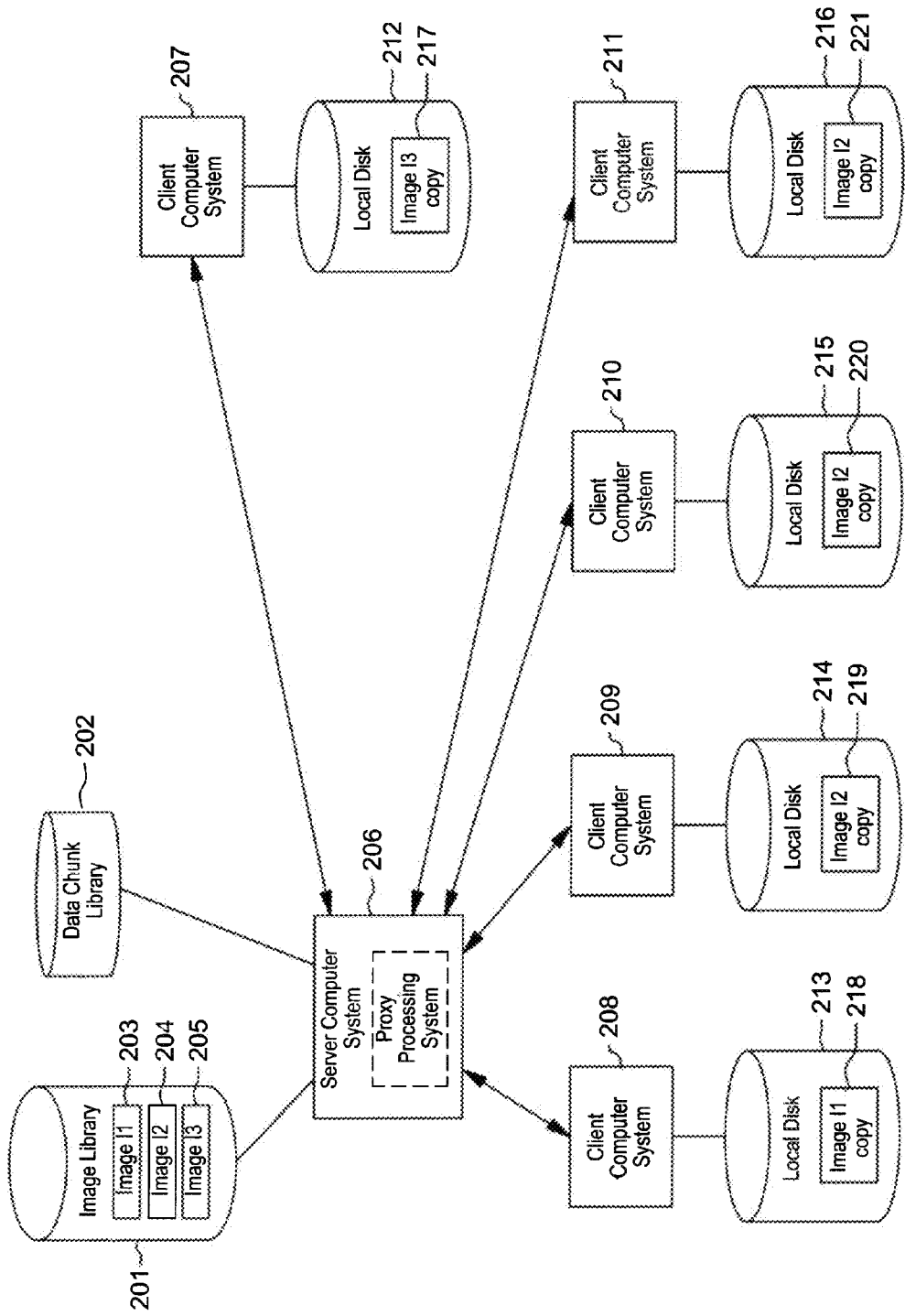
FIG. 2 depicts a distributed computing system comprising a server and a plurality of clients.

FIG. 2 depicts a distributed computer system comprising a server 206 and a plurality of clients 207-211. The server has at least read access to an image library 201 and to a data chunk library 202. The image library comprises a set of data portions 203-205, in this case images, which are to be distributed by the server to the plurality of clients. Each client is operatively coupled to a local disk 212-216, e.g. an internal or external non-transitory storage medium. Each client can request an image 203-205 from the server. The received image is stored by the client to its respective local disk. For example, client 208 has requested image 203 and has stored a copy 218 of said image to its local disk 213. Clients 209-211 have requested image 204 and have respectively stored a copy 219-221 of image 204 in their respective local disks.

Figure 3:
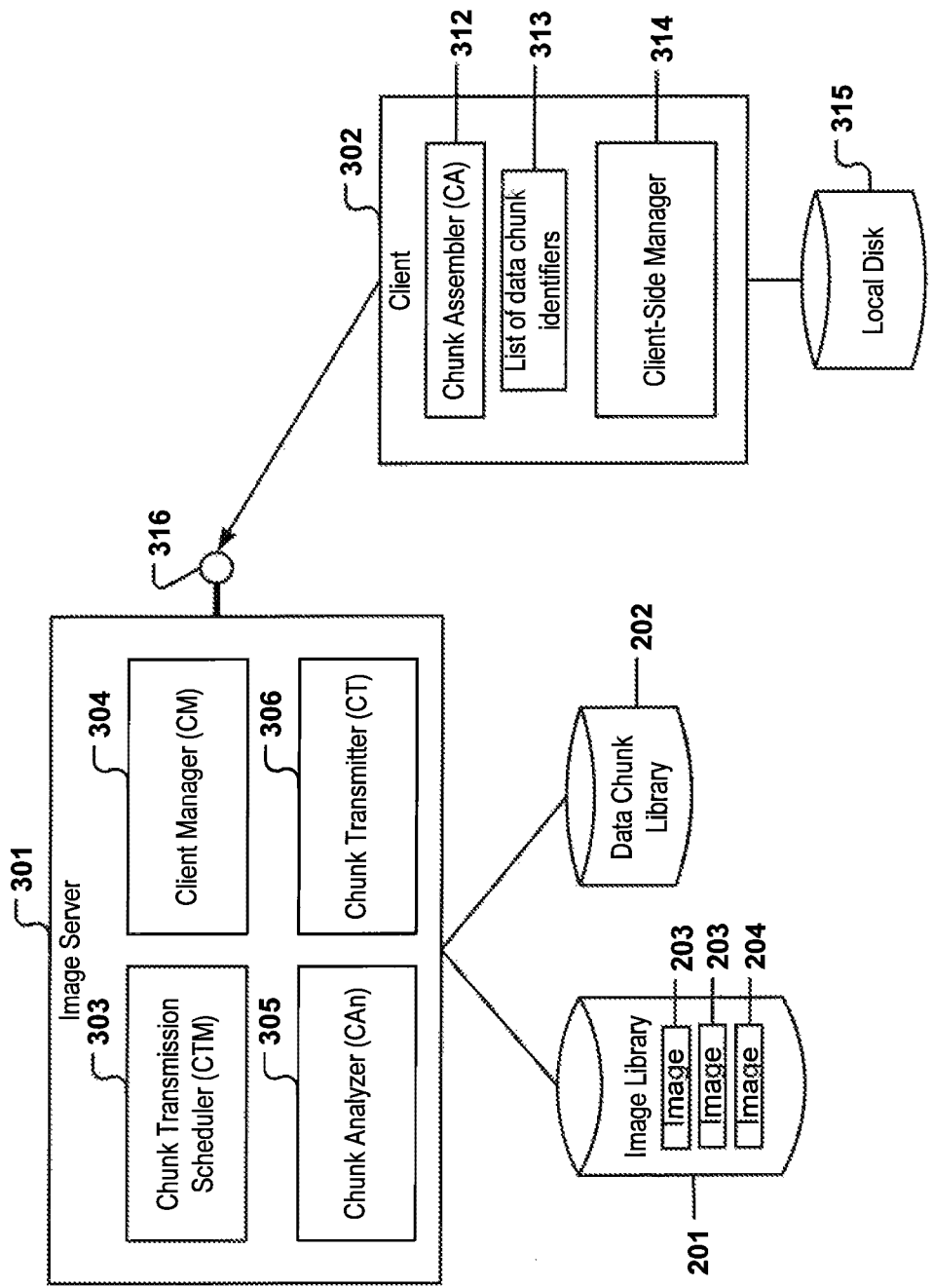
FIG. 3 depicts a block diagram of a server and a client.

FIG. 3 is a block diagram showing a server 301, here referred to as 'image server' and a client 302 ('client') in greater detail. Client 302 is operable to submit a request for receiving a data portion, in this case an image, via an API 316 to the image server. The request comprises an identifier of the image, here called 'portion identifier' of the image, the client requests to receive. According to embodiments, the image server 301 comprises a CTS module 303, a client manager module 304, a CAn module 305 and a CT module 306.

The chunk analyzer (CAn) module 305 is responsible for creating the data chunk library 202 from the plurality of data portions 203-205 comprised in the data portion library 201. If a new data portion is added to the image library, said CAn module analyzes the new data portion, thereby logically dividing the new data portion into data chunks and adding new data chunks to the data chunk library. Each data chunk of the data chunk library is assigned with meta-data comprising a portion identifier of the data portion the data chunk was derived from. In case the CAn module determines that a data chunk of a new data portion is already contained in the data chunk library, the meta-data of said respective data chunk in the data chunk library is updated thus that said meta-data also comprises the portion identifier and corresponding positional information of said new data portion. The original images are physically not altered by the chunking process.

The client manager (CM) module 304 is responsible for receiving first requests from one or more clients. Each first request is a request for transmitting a data portion, wherein said first request comprises a portion identifier of the requested data portion. The CM module accesses the data chunk library in order to compile a list of data chunk identifiers of all data chunks comprising in their respective meta-data the requested portion identifier. Said list of chunk identifiers defines the data chunks and associated positional information based on which a local copy of the requested data portion can be created on the client side. The compiled list of chunk identifiers is returned to the requesting client. Before or after having received the compiled chunk identifier list, the client subscribes to a network multicast address having been indicated by the server as being used for the transmission of the data chunks. As a result, any client having registered that for said multicast address will receive all data chunks sent by the server to said address. The CM module is operable to immediately proceed with transmitting data chunks of the data chunk library being specified by chunk identifiers in the compiled list to the client. Alternatively, the CM module can wait for a predefined or dynamically determined time period in order to collect additional first requests of clients. In case that a multitude of client requests a multitude of data portions within said time period, the pooling of the requests by the CM module allows optimization of the transmission of data chunks to be transferred to computer to the plurality of client systems, thereby for example minimizing the overall transmission time or the transmission time for selected clients or for selected data chunks. Typically, the data portions to be distributed share at least some data. For example, in case the data portions 203-205 are images, they may share data chunks encoding instructions of the operating system or of application programs having been installed on a plurality of images. In general, the longer the CM module waits in order to collect additional first requests, the larger the potential for synergies and the higher the overall efficiency in image distribution. However, said time for pooling first requests has to be balanced against the delay in initiating the transmission. Therefore, the time used for pooling first requests should be adapted on the typical frequency of incoming first requests in each particular system in order to avoid bottlenecks caused by an inappropriately short or long waiting time.

Depending on the embodiment, optimizing the transmission of data chunks can be executed by instructions being integral part of the CM module 304 or being encoded in a separate CTS module 303 as is the case for the embodiment depicted in FIG. 3. Data chunks having been scheduled to be transmitted to a multitude of clients are sent out by the CTS module to a multicast destination address said clients have subscribed to. Said module is thereby operable to execute multiple optimization operations including the use of several multicast streams and corresponding multicast addresses depending on the similarity of the data portions to be transmitted and/or the likelihood of identical data chunks. The optimization procedure is a compromise between reducing network traffic and client CPU consumption and can be configured as to increase efficiency of the overall transmission process by submitting multiple identical data chunks for multiple clients by means of a multicast transmission protocol. According to some embodiments, the optimization strategies depend on the configuration of the CM module and/or depend on dynamically determined parameters. The optimization strategies may be directed at any of the following goals: minimizing the overall time for transferring all data chunks of the at least one requested data portion requested by any of the clients, minimizing the time for transferring all data chunks requested by a sub-set of the one or more requesting clients, each client belonging to said sub-set having assigned a priority level, or minimizing the time for transferring a first set of data chunks of the at least one requested data portion to the one or more requesting clients, the first set of data chunks being a sub-set of all data having been requested by the one or more clients. The optimization may be direct it to each of said goals individually or to any combination of that individual goals. The task of physically transferring the data chunks is executed by the CT module. According to preferred embodiments, multicast transmission mode is used for transferring data chunks in case at least n of the requesting clients have requested a data portion comprising said data chunk, wherein n can be any number larger than 0. In case a data chunk was requested only by one client, said data chunk is preferentially transferred in unicast transmission mode. The order in which data chunks are transmitted to the plurality of client thereby depends on the chosen optimization strategy.

The client 302 comprises a chunk assembler (CA) module 312 and a client side manager module 314. The client side manager module is operable to submit a first request comprising a portion identifier to the server, wherein said first request is a request for receiving the data portion identified by said portion identifier. The client side manager module is in addition operable to subscribe and unsubscribe from a multicast subscriber list for receiving data chunks of the requested data portion. As data chunks pass by the client, the client side manager module checks whether a received data chunk is specified by any of the chunk identifiers being contained in the chunk identifier list having been received by the client previously. If the received data chunk is specified by one of the chunk identifiers in said list, said data chunk is taken and further processed, e.g. written to a local data storage 315 of the client. According to embodiments, the list of chunk identifiers having been received by the client in addition comprises positional information indicating where each data chunk within the requested data portion was located. Based on that positional information, the client by means of a CA module 312 reconstructs/reassembles a local copy of the requested data portion.

According to embodiments, a client having registered for receiving a plurality of data chunks of a requested data portion may receive via a multicast protocol more data chunks than actually requested. For example, the server may have pooled similar requests of 5 different clients for 4 different data portions and may have started transferring a unique list of data chunks which constitute said 4 requested data portions. As said plurality of data chunks is a non-redundant set of data chunks, its size may be much smaller than the total size of the 4 requested data portions. The server transfers said plurality of data chunks to said 5 requesting clients e.g. according to a multicast transmission protocol. As according to that scenario the plurality of transmitted data chunks comprises data chunks which may have been requested by some but not by all of said five clients, each client has to evaluate each received data chunk individually and specifically select only those data chunks which are specified by chunk identifiers in each respectively received list of chunk identifiers. Accordingly, it may increase efficiency to submit, for a plurality of requesting clients, the unique set of data chunks covering all requested data portions. In other use case scenarios, a plurality of data chunks is transferred by the server to a plurality of clients in a multicast transmission mode, wherein said plurality of data chunks does not cover all requested data portions completely but merely comprises data chunks having been requested by two or more clients. Data chunks having been requested by only one single client are transmitted in said use case scenario to said respective clients in unicast transmission mode. According to preferred embodiments, TCP-based unicast delivery is used for transferring data chunks in unicast transmission mode. This reduces the data load delivered to the other clients and network components, because the number of data chunks transferred in multicast mode to all requesting clients is reduced. Thus, also the total number of data chunks which have to be compared with chunk identifiers of each respective chunk identifier list is reduced.

According to embodiments, the chunk assembler (CA) module 314 is operable to determine, by a comparison of the received data chunks with data chunk identifiers of the received list, data chunks being still outstanding after a defined period of time. The CA module is operable to submit a request for resubmitting the outstanding data chunks via API 316 to the image server 301, to receive the outstanding data chunks from the server and to use said received data chunks to assemble a local copy of the requested data portion. A request for resubmission of data chunks comprises the chunk identifiers of the outstanding data chunks. According to further embodiments, the CA module is operable to submit to the server via API 316 the progress state of the transfer of data chunks of the requested data portion. The submitted progress information comprises the portion identifier of the requested data portion and chunk identifiers of the data chunks having already been received. Accordingly, the client is operable to monitor its current chunk download status, to request outstanding data chunks and to notify the server on the transfer progress.

Figure 4:
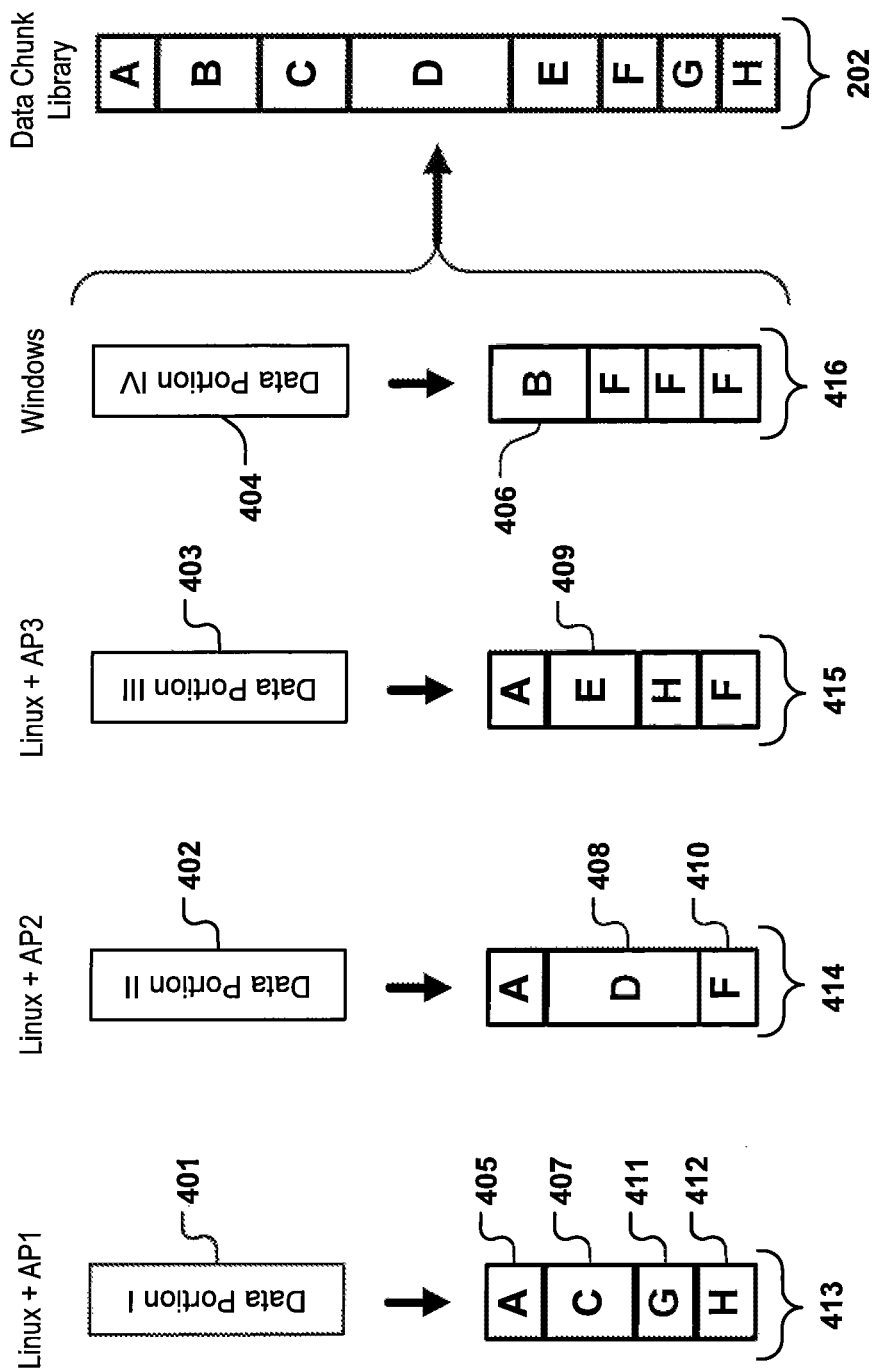
FIG. 4 depicts 4 data portions and a data chunk library having been derived therefrom.

FIG. 4 is a block diagram comprising graphical representations of 4 data portions 401-404 and of a data chunk library 202 having been derived from said data portions by the CAn module 305. Data portions 401-403 are Linux-based file system images having installed different application programs AP1-AP3. Data portion 404 is a Windows-based file-system image. According to embodiments, CAn module analyzes the data portions by inspecting the respective file system on multiple different levels: at first, a comparison is executed on the file level by searching for files with identical filenames and file sizes. In case they file with the same file name and file size was detected on multiple data portions, said detected file is further analyzed to determine if its data content is identical, e.g. by calculating and comparing hashes of said files. Shared files may constitute large data chunks and further chunk analysis may focus on memory blocks outside said large data chunks. In a next step, which can also be executed without a preceding file level based comparison, a block wise comparison for equality of the data portions in memory blocks of data portion library is made. The blocks may thereby be based on the set of blocks provided by the file system the respective data portion is based on. According to embodiments, adjacent blocks being shared by two or more data portions are concatenated to get larger blocks, which are referred herein as 'data chunks'. Data chunks can quickly be identified and can later on be quickly compared with each other for equality by calculating hashes. The data chunks of the data chunk libraries do not have to be of the same size. The chunk size is thereby a compromise, because a large chunk size comes with the advantage of reducing traffic scheduling overhead but is also connected with the disadvantage of reducing the number of data portions sharing a particular data chunk. In the depicted embodiment, data portion 401 is 'chunked' into a set 413 of data chunks comprising data chunks 405, 407, 411 and 412, thereby creating and/or updating the data chunk library 417. As a result of the chunk analysis a unique list of data chunks is identified and stored in the form of a data chunk library 417.

Figure 5:
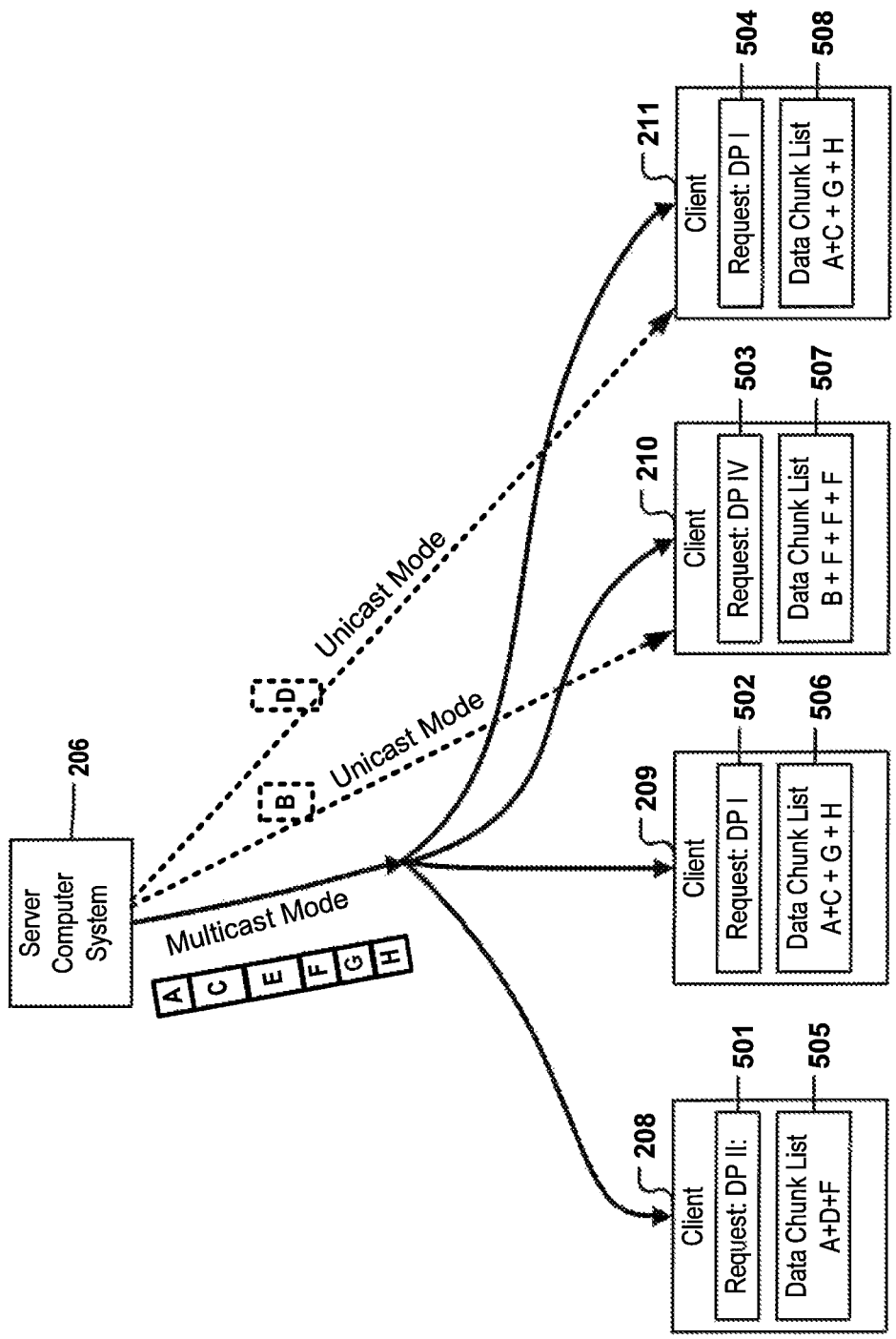
FIG. 5 depicts a server transferring data chunks to 4 clients in a multicast and a unicast mode.

FIG. 5 depicts a server 206 transferring data chunks to 4 clients 208-211 in a multicast and a unicast mode. Each client has received a list of chunk identifiers 505-508 from the server wherein the data chunks specified in said lists correspond to a first requests 501-504 having been submitted by each respective client. Data chunks A, C, E, F, G and H are requested by two or more clients and are, accordingly, transferred to all clients 208-211 in a multicast mode (depicted as continuous black arrows). A client may receive a data chunk it has not requested. For example, client 209 having requested data portion DP I does not need data chunk F in order to assemble a local copy of DP I. Nevertheless, client 209 will receive data chunk F from the server. However, as the list 506 of data chunk identifiers of said client does not comprise a chunk identifier for F, F will be ignored by client 209. Data chunks having been requested only by one single client respectively, in this case data chunks B and D, are transferred in unicast mode from the server to the respective clients 210, 211. As can be clearly derived from FIG. 5, embodiments of the invention make the transfer of data portions to a multitude of clients more efficient: if the data chunks required for creating local copies of the requested data portions would all have been transferred via unicast protocols, at least 13 data chunks would have to be transferred: A+D+F, A+C+G+H, B+F (+F+F), A+C+G+H. In case said data chunks would have been transferred based on data portion specific multicasting, at least 9 data chunks would have to be transferred: A+D+F (client 208), A+C+G+H (clients 209 and 211), and B+F+(F+F) (client 210). According to embodiments of the invention, only 7 data chunks need to be transferred: F+A+H+C+G are transferred via a multicast protocol while B and D are transferred via a unicast protocol.

What is claimed is:

1. A method for distributing a plurality of data portions from a server computer system to a plurality of client computer systems, comprising:
   operatively coupling the server computer system to a non-transitory computer-readable storage medium;
   storing, in the storage medium, a data portion library, the data portion library comprising the plurality of data portions, each data portion being dividable into data chunks, wherein a portion identifier is assigned to each data portion;
   storing, in the storage medium, a data chunk library, the data chunk library comprising all the data chunks constituting the plurality of data portions, wherein meta-data is assigned to each data chunk of the data chunk library, the meta-data of a given data chunk comprising the portion identifiers of the data portions said data chunk is contained in;
   obtaining, by a processor of the server, one or more first requests, each first request obtained from a client computer system of the plurality of client computer systems and each first request comprising a portion identifier;
   in response to each of the one or more first requests, transmitting, by the processor, a list of chunk identifiers to the requesting client computer system, wherein the list of chunk identifiers specifies the data chunks whose meta-data comprise the data portion identified by the portion identifier contained in the first request of the client computer system;
   obtaining, by the processor, a second request, during a time period, from the client computer system, the second request comprising a request to transmit data chunks and an identifier of the client computer system;
   evaluating, by the processor, the second request; and
   transmitting, by the processor, data chunks to each of the requesting client computer systems of the plurality of client computer systems, wherein the composition of the data chunks transmitted depends on a result of the evaluation, and wherein the data chunks transmitted comprise the data chunks in the list of chunk identifiers.

2. The method of claim 1, further comprising, specifically selecting, by each of the requesting client computer systems, the data chunks of the transmitted data chunks, which are specified by the respectively transmitted list of chunk identifiers.

3. The method of claim 1, further comprising:
   using components of a virtual machine image distribution infrastructure to execute the method, wherein the data portions are images, and the server computer system is a virtual machine image server; and
   storing by each of said requesting client computer systems the specifically selected data chunks to a storage volume operatively coupled to said client computer system, thereby creating a copy of one of said images on said storage volume.

4. The method of claim 1, wherein:
   the server computer system communicates with the plurality of client computer systems via a proxy processing system;
   the proxy processing system receives the one or more first requests and forwards said first requests to the server computer system;
   the proxy processing system receives the one or more list of chunk identifiers transmitted by the server computer system and forwards said one or more list of chunk identifiers to the respective client computer systems, wherein the proxy processing system in addition aggregates said received one or more list of chunk identifiers to one proxy-chunk-list; and
   the proxy processing system forwards each data chunk transmitted by the server computer system to the plurality of client computer systems in multicast mode in case said data chunk is specified by a chunk identifier of the proxy-chunk-list, or forwards each data chunk transmitted by the server computer system to one of the plurality of client computer systems in unicast mode in case said data chunk is not specified by a chunk identifier in said proxy-chunk-list.

5. The method of claim 1, further comprising;
   submitting the one or more first requests to the server computer system, said one or more first requests each comprising a portion identifier of the data portion;
   responsive to the transmitting the list of chunk identifiers to the requesting client computer system, receiving at the requesting client computer system(s) the list of chunk identifiers of data chunks transmitted from the server computer system in response to the one or more first requests, wherein a data portion is constituted by data chunks being identified by said list of chunk identifiers;
   receiving at the requesting computer system(s) the data chunks transmitted by the server computer system during the transmitting the data chunks to each of the requesting client computer systems; and
   specifically selecting the data chunks from said received data chunks which are specified by said received list of chunk identifiers.

6. The method of claim 1, wherein the data chunks of the second request comprise data chunks in the list of chunk identifiers.

7. A computer program product for distributing a plurality of data portions from a computer system, the computer program product comprising:
 a non-transitory computer-readable storage medium readable by a processor and storing instructions for execution by the processor for performing a method comprising:
  operatively coupling the computer system to the non-transitory computer-readable storage medium;
  storing, in the storage medium, a data portion library, the data portion library comprising the plurality of data portions, each data portion being dividable into data chunks, wherein a portion identifier is assigned to each data portion;
  storing, in the storage medium comprises, a data chunk library, the data chunk library comprising all the data chunks constituting the plurality of data portions, wherein meta-data is assigned to each data chunk of the data chunk library, the meta-data of a given data chunk comprising the portion identifiers of the data portions said data chunk is contained in;
  obtaining, by the processor, one or more first requests, each first request obtained from a client computer system of the plurality of client computer systems and each first request comprising a portion identifier;
  in response to each of the one or more first requests, transmitting, by the processor, a list of chunk identifiers to the requesting client computer system, wherein the list of chunk identifiers specifies the data chunks whose meta-data comprise the data portion identified by the portion identifier contained in the first request of the client computer system;
  obtaining, by the processor, a second request, during a time period, from the client computer system, the second request comprising a request to transmit data chunks and an identifier of the client computer system;
  evaluating, by the processor, the second request; and
  transmitting, by the processor, data chunk to each of the requesting client computer systems of the plurality of client computer systems, wherein the composition of the data chunks transmitted depends on a result of the evaluation, and wherein the data chunks transmitted comprise the data chunks in the list of chunk identifiers.

8. The computer program product of claim 7, further comprising specifically selecting by each of the requesting client computer systems the data chunks of the transmitted data chunks which are specified by the respectively transmitted list of chunk identifiers.

9. The computer program product of claim 7, the method further comprising:
 using components of a virtual machine image distribution infrastructure to execute the method, wherein the data portions are images, and the server computer system is a virtual machine image server; and
 storing by each of said requesting client computer systems the specifically selected data chunks to a storage volume operatively coupled to said client computer system, thereby creating a copy of one of said images on said storage volume.

10. The computer program product of claim 7, wherein:
 the server computer system communicates with the plurality of client computer systems via a proxy processing system;
 the proxy processing system receives the one or more first requests and forwards said first requests to the server computer system;
 the proxy processing system receives the one or more list of chunk identifiers transmitted by the server computer system and forwards said one or more list of chunk identifiers to the respective client computer systems, wherein the proxy processing system in addition aggregates said received one or more list of chunk identifiers to one proxy-chunk-list; and
 the proxy processing system forwards each data chunk transmitted by the server computer system to the plurality of client computer systems in multicast mode in case said data chunk is specified by a chunk identifier of the proxy-chunk-list, or forwards each data chunk transmitted by the server computer system to one of the plurality of client computer systems in unicast mode in case said data chunk is not specified by a chunk identifier in said proxy-chunk-list.

11. The computer program product of claim 7, the method further comprising:
 submitting the one or more first requests to the server computer system, said one or more first requests each comprising a portion identifier of the data portion;
 responsive to the transmitting the list of chunk identifiers to the requesting client computer system, receiving at the requesting client computer system(s) the list of chunk identifiers of data chunks transmitted from the server computer system in response to the one or more first requests, wherein a data portion is constituted by data chunks being identified by said list of chunk identifiers;
 receiving at the requesting computer system(s) the data chunks transmitted by the server computer system during the transmitting the data chunks to each of the requesting client computer systems; and
 specifically selecting the data chunks from said received data chunks which are specified by said received list of chunk identifiers.

12. The computer program product of claim 7, wherein the data chunks of the second request comprise data chunks in the list of chunk identifiers.

* * * * *